United States Patent
Shimada

(10) Patent No.: US 9,401,667 B2
(45) Date of Patent: Jul. 26, 2016

(54) VIBRATION-TYPE DRIVING DEVICE

(71) Applicant: CANON KABUSHIKI KAISHA, Tokyo (JP)

(72) Inventor: Akira Shimada, Saitama (JP)

(73) Assignee: Canon Kabushiki Kaisha, Tokyo (JP)

(*) Notice: Subject to any disclaimer, the term of this patent is extended or adjusted under 35 U.S.C. 154(b) by 337 days.

(21) Appl. No.: 14/193,891

(22) Filed: Feb. 28, 2014

(65) Prior Publication Data
US 2014/0246953 A1 Sep. 4, 2014

(30) Foreign Application Priority Data

Mar. 1, 2013 (JP) ................... 2013-041158

(51) Int. Cl.
  H02N 2/00    (2006.01)
  H01L 41/09   (2006.01)
  H02N 2/02    (2006.01)
  H02N 2/10    (2006.01)

(52) U.S. Cl.
  CPC .............. *H02N 2/0095* (2013.01); *H02N 2/02* (2013.01); *H02N 2/106* (2013.01)

(58) Field of Classification Search
  USPC .................................................. 310/311–371
  See application file for complete search history.

(56) References Cited

U.S. PATENT DOCUMENTS

2002/0096971 A1* 7/2002 Tsukimoto ............. H02N 2/106
  310/323.03

FOREIGN PATENT DOCUMENTS

| JP | 10-075589 A | 3/1998 |
| JP | H10-075589 A | 3/1998 |
| JP | 2007-151373 A | 6/2007 |
| JP | 2007151373 A | 6/2007 |
| JP | 4841432 B2 | 12/2011 |

* cited by examiner

*Primary Examiner* — Thomas Dougherty
(74) *Attorney, Agent, or Firm* — Canon USA Inc. IP Division

(57) ABSTRACT

A vibration-type driving device includes a vibrator including an electro-mechanical transducer and an elastic portion supported by a shaft, and a rotor the position of which relative to the vibrator changes. The rotor includes a first rotor having a threaded portion engaging with a first threaded portion formed on the elastic portion, and a second rotor having a threaded portion engaging with a second threaded portion formed on the shaft. The first rotor and the second rotor are configured to be driven integrally with each other, with a spring member between the first rotor and the second rotor.

19 Claims, 2 Drawing Sheets

VIBRATION AMPLITUDE
IN VIBRATION MODE

VIBRATION-TYPE DRIVING DEVICE

BACKGROUND OF THE INVENTION

1. Field of the Invention

The present invention relates to a vibration-type driving device (for example, a vibration wave motor), and more specifically, it relates to a vibration-type driving device that includes a vibrator vibrated by a piezoelectric body, the vibrator having a threaded portion formed thereon, and that includes a rotor engaged with the threaded portion and frictionally driven by vibration excited in the vibrator.

2. Description of the Related Art

In general, vibration-type driving devices are used, for example, for driving camera lenses and stages.

Some vibration-type driving devices have a vibrator and a moving body engaged with each other with threaded portions therebetween, and a piezoelectric element that excites vibration in the vibrator.

A conventional screw-driven vibration-type driving device will be described below (see, for example, Japanese Patent No. 4841432).

It includes a threaded shaft having an axis of rotation, and a nut engaged therewith. A piezoelectric element is fixed to the nut, and this piezoelectric element excites a primary bending vibration in the nut, in the direction of axis of rotation.

By exciting the orthogonal bending modes with a plus or minus 90-degree phase shift, a circular orbit is created, and the nut is moved in the orbital direction.

The threaded shaft can thereby be caused to simultaneously rotate and move in the axial direction.

In order to obtain a desired drive torque in a screw-driven vibration-type driving device such as that described in Japanese Patent No. 4841432, an appropriate frictional force needs to be generated between a vibrator such as the above-described nut and a moving body such as the above-described shaft, and therefore a pressing force needs to be applied.

However, the configuration described in Japanese Patent No. 4841432 has a problem that when the driving body or moving body is pressed by a spring component (pressure spring) or the like, and when the moving body moves in the axial direction, the pressing force changes with the moving distance thereof.

SUMMARY OF THE INVENTION

An aspect of the present disclosure relates to a vibration-type driving device in which the pressing force is not changed during driving and a stable drive torque can be obtained.

In an aspect described herein, a vibration-type driving device includes a vibrator including an electro-mechanical transducer and an elastic portion supported by a shaft, and a rotor the position of which relative to the vibrator changes. The rotor includes a first rotor having a threaded portion engaging with a first threaded portion formed on the elastic portion, and a second rotor having a threaded portion engaging with a second threaded portion formed on the shaft. The first rotor and the second rotor are configured to be driven integrally with each other, with a spring member between the first rotor and the second rotor.

Further features of the present invention will become apparent from the following description of exemplary embodiments with reference to the attached drawings.

BRIEF DESCRIPTION OF THE DRAWINGS

FIG. 2A is a sectional view of the vibrator, and FIG. 2B shows the vibration mode of the vibrator.

DESCRIPTION OF THE EMBODIMENTS

An embodiment of the present invention will be described below.

As an embodiment, a configuration example of a vibration-type driving device will be described with reference to FIG. 1.

The vibration-type driving device of this embodiment includes a vibrator that has an electro-mechanical transducer and an elastic portion supported by a shaft and in which an elliptic motion is generated in the elastic portion by applying a drive signal to the electro-mechanical transducer.

Figure 1:
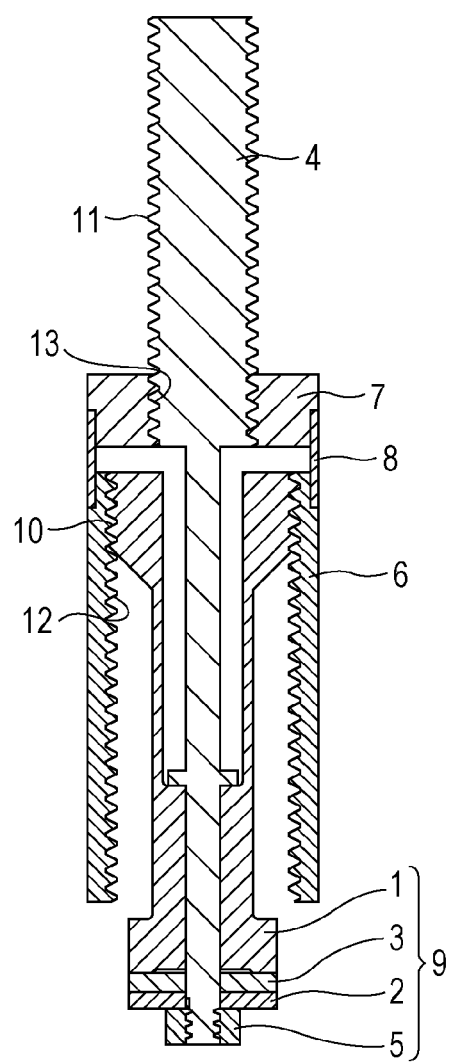
FIG. 1 is a sectional view illustrating a configuration example of a vibration-type driving device.

Specifically, in FIG. 1, reference numeral 1 denotes a first elastic body, reference numeral 2 denotes a second elastic body, reference numeral 3 denotes a piezoelectric element (electro-mechanical transducer), reference numeral 4 denotes a shaft, and reference numeral 5 denotes a nut.

The first elastic body 1 and the second elastic body 2 are clamped together with the piezoelectric element 3 therebetween by the shaft 4 and the nut 5 at a predetermined clamping force.

The first elastic body 1, the second elastic body 2, the piezoelectric element 3, the shaft 4, and the nut 5 form a rod-like vibrator 9.

The first elastic body 1 has a male thread 10 (first threaded portion) formed on the outer periphery of the upper part (in the figure) thereof.

The shaft 4 has a male thread 11 (second threaded portion) formed on the outer periphery of the upper part (in the figure) thereof. The upper part of the shaft 4 is fixed to another component (not shown).

A first rotor (moving body) 6 has a female thread 12 formed in the inner periphery thereof, and the female thread 12 is engaged with the male thread 10 of the first elastic body 1. The pitch of the male thread 10 is equal to the pitch of the female thread 12.

A second rotor 7 has a female thread 13 formed in the inner periphery thereof, and the female thread 13 is engaged with the male thread 11 of the shaft 4. The pitch of the male thread 11 is equal to the pitch of the female thread 13.

A pressure spring 8 serving as a spring member is placed between the first rotor 6 and the second rotor 7, and a predetermined pressing force is applied in the axial direction.

Although, in this embodiment, a pressure spring is used as a spring member, pressing force may be applied in the axial direction using a tension spring.

The piezoelectric element 3 includes electrode groups each consisting of two electrodes, and when alternating electric fields of different phases are applied to each electrode group from a power source (not shown), two orthogonal bending vibrations are excited in the above-described rod-like vibrator 9.

Figure 2A:
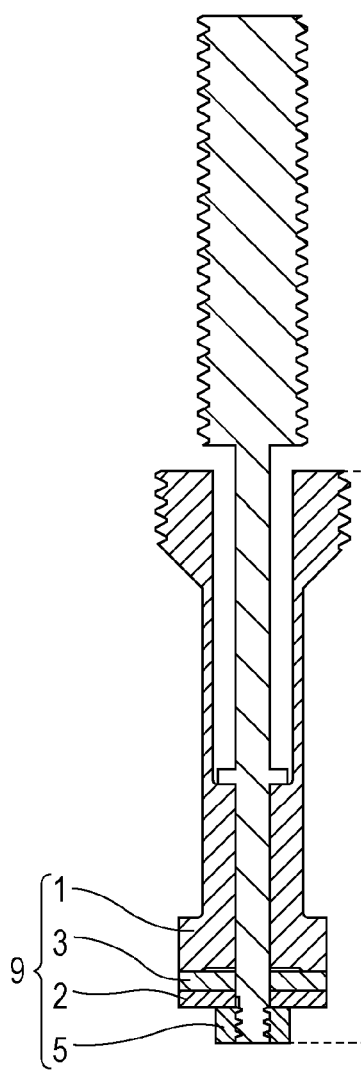
FIGS. 2A and 2B illustrate the vibration-type driving device.
Figure 2B:
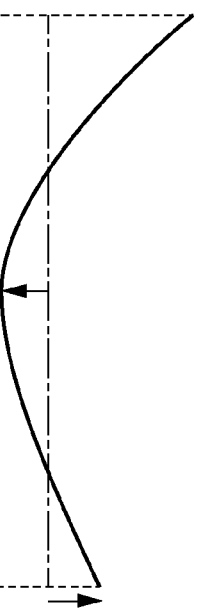

FIG. 2A is a sectional view of the vibrator 9, and FIG. 2B illustrates the vibration amplitude in the vibration mode of the vibrator 9. FIG. 2B illustrates one of the two bending vibrations, and the other is generated in a direction perpendicular to the paper plane. By adjusting the phases of the applied alternating electric fields, a temporal phase difference of 90 degrees can be provided between the two bending vibrations, and as a result, the bending vibration of the vibrator 9 rotates about the axis of the shaft 4.

As a result, an elliptic motion is generated in the male thread 10 of the first elastic body 1, and the first rotor 6 pressed by the male thread 10 is frictionally driven.

The first rotor 6 and the second rotor 7 are thereby moved along the thread, while rotating about the axis of the shaft 4 integrally with the pressure spring 8, in the axial direction.

As shown in FIG. 1, the outer diameter of the male thread 10 cab be greater than the outer diameter of the male thread 11.

When the first rotor 6 moves upward in FIG. 1, the first rotor 6 does not come into contact with the male thread 11, and the movable distance of the first rotor 6 can be increased.

The pitch of the male thread 10 can be equal to the pitch of the male thread 11. When the pitch of the male thread 10 is equal to the pitch of the male thread 11, the distance between the first rotor 6 and the second rotor 7 is kept constant even when the first rotor moves up and down in the axial direction, and therefore the pressing force of each rotor can be made constant.

The frictional force acting between the male thread 11 and the female thread 13 is a load on the vibration-type driving device, and therefore the frictional force can be as small as possible. Therefore, the second rotor 7 (the female thread 13) may be formed of a material having a low friction coefficient. For instance, the second rotor 7 (the female thread 13) may be formed of resin such as resin comprising one selected from the group consisting of polyacetal, poly tetra fluoro ethylene, polycarbonate, and nylon as main component. Alternatively, lubricant such as grease may be applied.

On the other hand, as for the male thread 10 and the female thread 12, they transmit the vibration of the vibrator 9 through frictional force to the first rotor 6 and drive the first rotor 6, and therefore abrasion resistance as well as a certain level of frictional force is required. Therefore, the first rotor 6 (the female thread 12) may be formed of a material having a high abrasion resistance and a high friction coefficient against the first elastic body 1 (the male thread 10). For instance, the first rotor 6 (the female thread 12) may be formed of stainless steel which has been nitrided or ceramics such as aluminum oxide.

The moving speed of the first rotor 6 can be adjusted by changing the pitch and diameter of the thread, and the vibration amplitude and frequency of the vibrator.

Owing to the above-described configuration, a vibration-type driving device can be provided in which the pressing force is not changed during driving and a stable drive torque can be obtained.

In this embodiment, a configuration example is shown in which the movement of the vibrator in the axial direction of the shaft is restricted, and the rotor is driven in the axial direction.

The present invention is not limited to such a configuration, and the movement of the rotor in the axial direction of the shaft may be restricted, and the vibrator may be driven in the axial direction of the shaft. To sum up, the rotor and the vibrator only have to be driven relative to each other by the elliptic motion of the elastic body.

For example, by fixing the rotor, the vibrator can be rotated and driven in the axial direction. By making the rotor rotatable but immovable in the axial direction, the vibrator can be driven in the axial direction.

By making the vibrator rotatable but immovable only in the axial direction, the rotor can be driven in the axial direction.

The rotor or the vibrator can be made rotatable but immovable in the axial direction, for example, by a rolling bearing.

Power can be fed to the rotating vibrator, for example, by disposing a slip ring coaxially with the vibrator.

Although this embodiment includes a Langevin type vibrator in which a piezoelectric element 3 is sandwiched between two elastic portions: a first elastic portion and a second elastic portion different from the first elastic portion, the present invention is not particularly limited to this.

The vibration-type driving device described in this embodiment can be used, for example, for driving an autofocus lens of an imaging apparatus. When the vibration-type driving device of this embodiment is used for driving an interchangeable lens, the interchangeable lens includes a lens and a vibration-type driving device that moves the lens, and the output of the rotation of the rotor is transmitted through an output transmitting member and is used for driving the lens. In an imaging apparatus including an imaging element and a lens, the vibration-type driving device of this embodiment may be provided for driving the lens.

The vibration-type driving device of this embodiment can also be used, for example, in an automatic stage. In the automatic stage, the vibration-type driving device is used for moving a stage for a microscope or the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-041158, filed Mar. 1, 2013, which is hereby incorporated by reference herein in its entirety.

What is claimed is:

1. A vibration-type driving device comprising:
   a vibrator including an electro-mechanical transducer and a first elastic portion supported by a shaft; and
   a rotor, wherein a relative position of the rotor and the vibrator changes,
   wherein the rotor includes a first rotor having a threaded portion engaging with a first threaded portion formed on the first elastic portion, and a second rotor having a threaded portion engaging with a second threaded portion formed on the shaft, and
   wherein the first rotor and the second rotor are configured to be driven integrally with each other, with a spring member between the first rotor and the second rotor.

2. The vibration-type driving device according to claim 1, wherein an inside diameter of the first rotor is greater than an outside diameter of the first elastic portion.

3. The vibration-type driving device according to claim 1, wherein the electro-mechanical transducer is disposed between the first elastic portion and a second elastic portion that is different from the first elastic portion.

4. The vibration-type driving device according to claim 1, wherein a pitch of the first threaded portion is equal to a pitch of the second threaded portion.

5. The vibration-type driving device according to claim 1, wherein an outside diameter of the first threaded portion is greater than an outside diameter of the second threaded portion.

6. The vibration-type driving device according to claim 1, wherein the threaded portion of the second rotor comprises resin.

7. The vibration-type driving device according to claim 6, wherein the resin comprises one selected from the group consisting of polyacetal, poly tetra fluoro ethylene, polycarbonate, and nylon, as main component.

8. The vibration-type driving device according to claim 1, wherein a lubricant is provided between the second threaded portion and the threaded portion of the second rotor.

9. The vibration-type driving device according to claim 1, wherein at least the threaded portion of the first rotor comprises stainless steel or ceramics.

10. The vibration-type driving device according to claim 9, wherein the stainless steel has been nitrided.

11. The vibration-type driving device according to claim 9, wherein the ceramics is aluminum oxide.

12. The vibration-type driving device according to claim 1, wherein the vibration-type driving device is configured so the moving speed of the first rotor is adjusted by changing at least one of a pitch of the thread of the first threaded portion, a diameter of the thread of the first threaded portion, a vibration amplitude of the vibrator, and a frequency of a drive signal of the vibration-type driving device.

13. The vibration-type driving device according to claim 1, wherein the movement of the vibrator in an axial direction of the shaft is restrained, and the rotor is driven in the axial direction.

14. The vibration-type driving device according to claim 1, wherein the movement of the rotor in an axial direction of the shaft is restrained, and the vibrator is driven in the axial direction of the shaft.

15. The vibration-type driving device according to claim 1, wherein the spring member is a pressure spring.

16. The vibration-type driving device according to claim 1, wherein an elliptical motion is generated in the first elastic portion by applying a drive signal to the electro-mechanical transducer.

17. An interchangeable lens comprising:
a lens; and
the vibration-type driving device according to claim 1 that moves the lens.

18. An imaging apparatus comprising:
an imaging element;
a lens; and
the vibration-type driving device according to claim 1 that moves the lens.

19. An automatic stage comprising:
a stage; and
the vibration-type driving device according to claim 1 that moves the stage.

* * * * *